H. BREWER.
MEASURING AND INDICATING APPARATUS.
APPLICATION FILED FEB. 21, 1919.
1,361,676.
Patented Dec. 7, 1920.
3 SHEETS—SHEET 1.
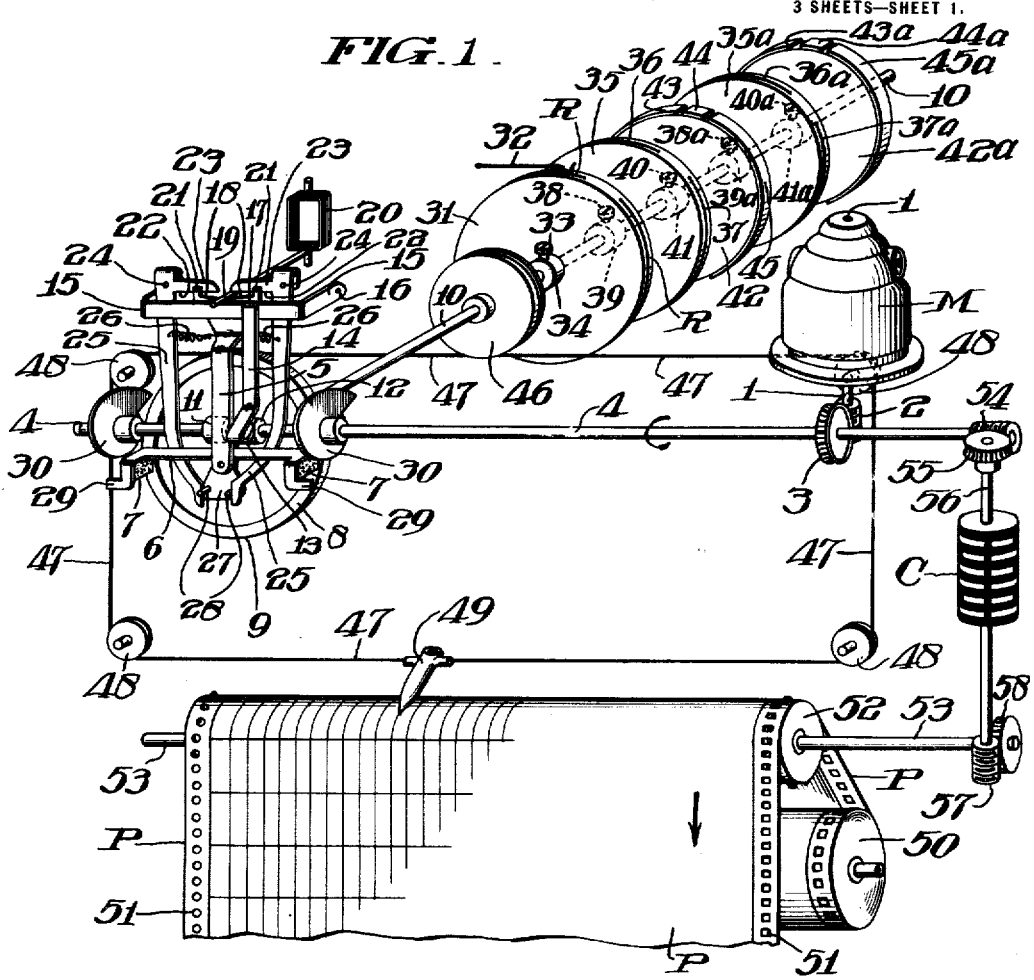
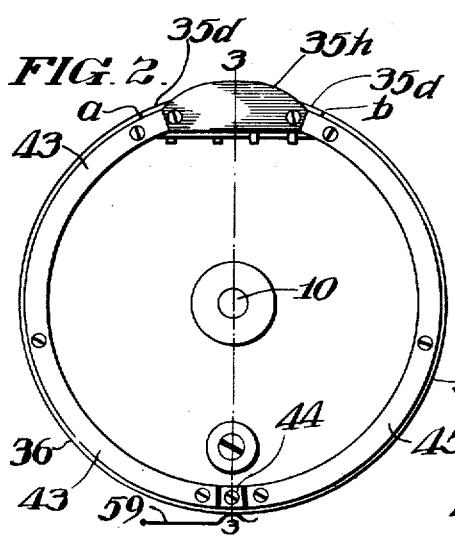
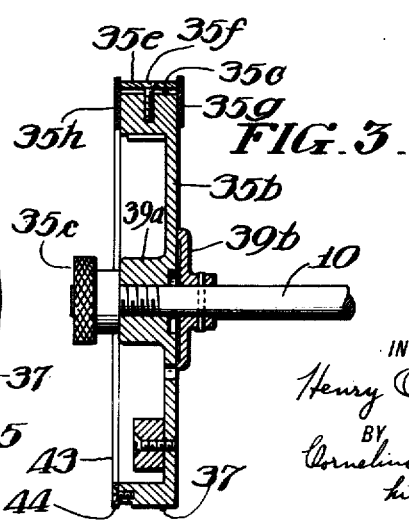
INVENTOR
Henry Brewer
BY
Cornelius D. Ehret
his ATTORNEY

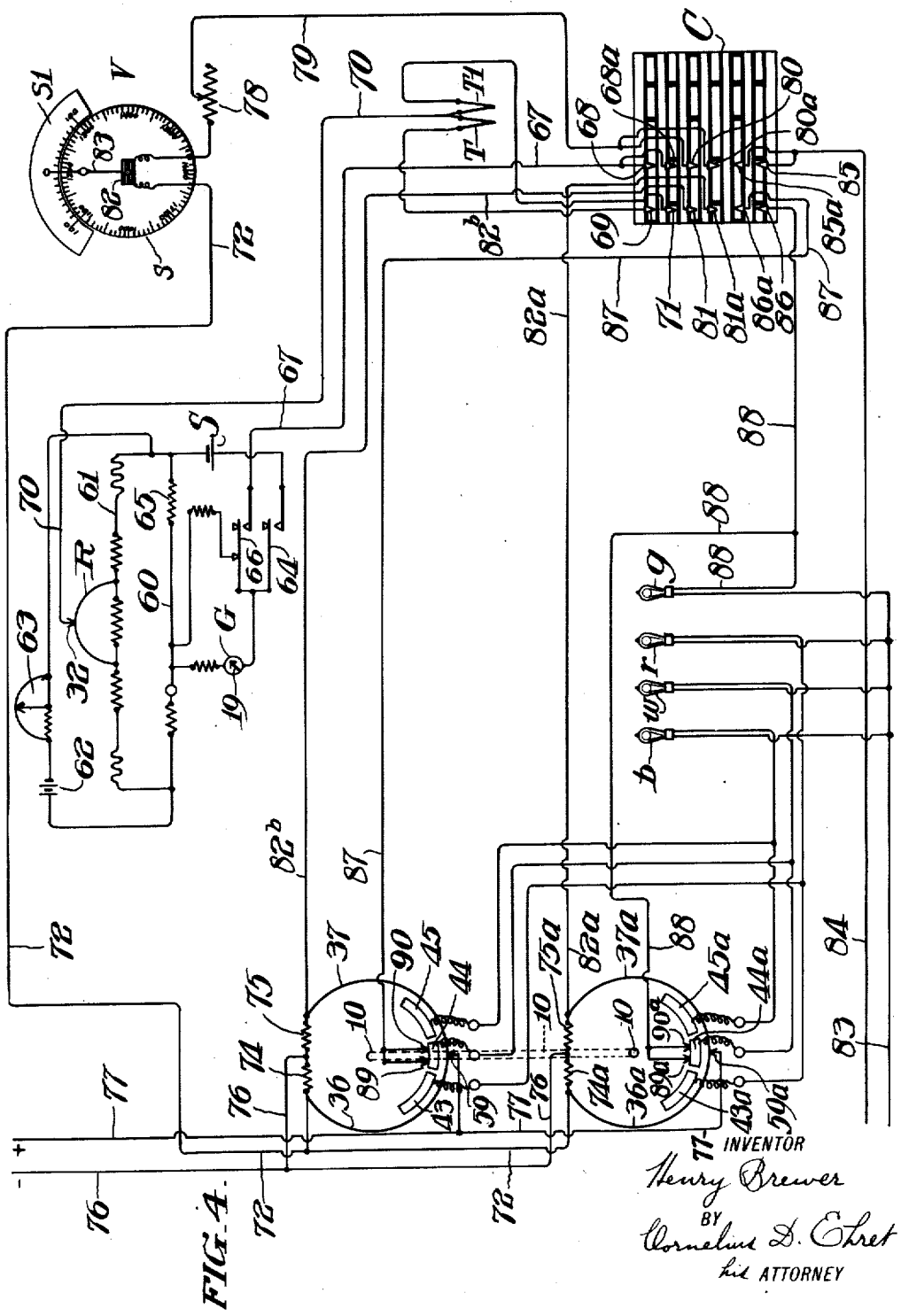

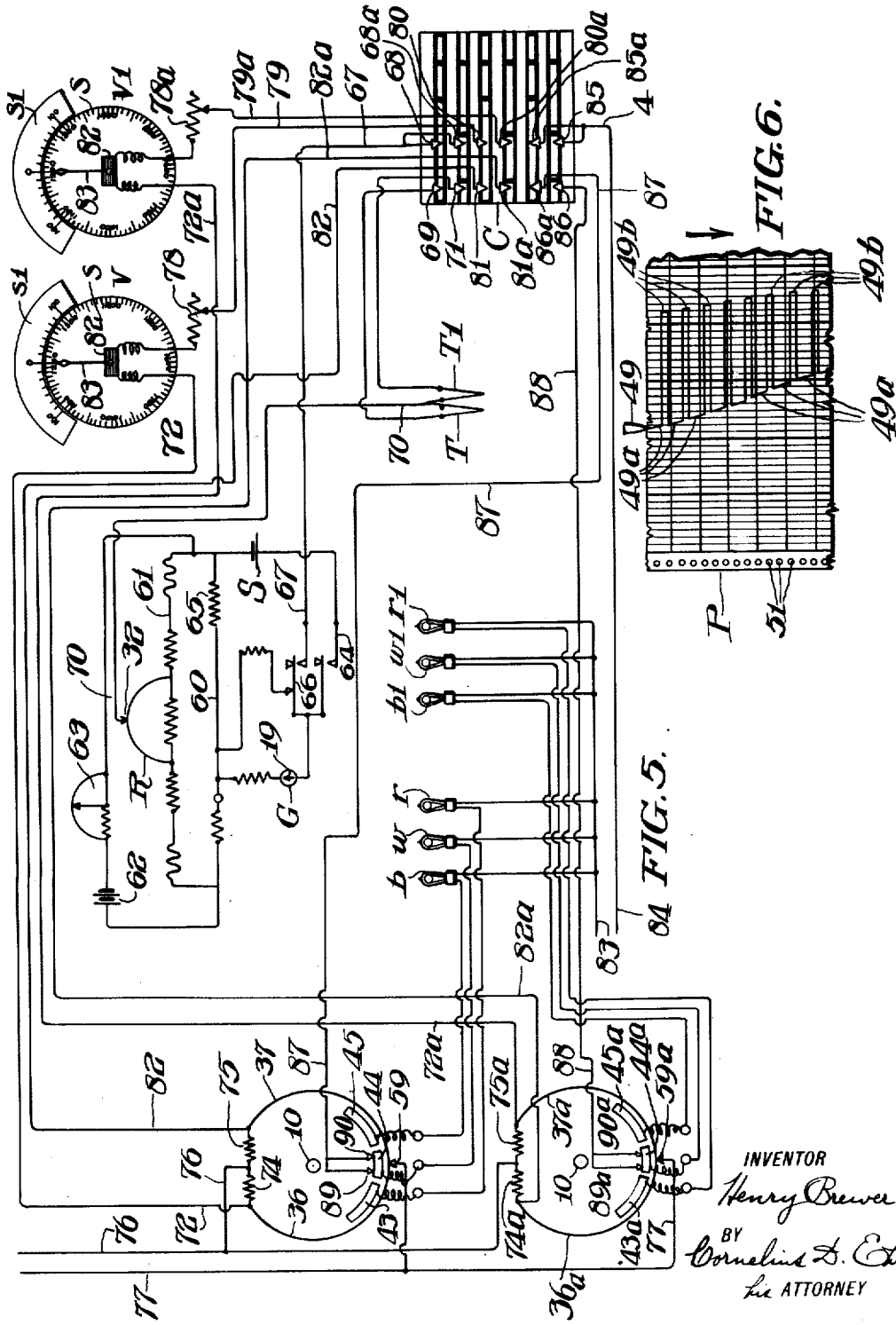

UNITED STATES PATENT OFFICE.

HENRY BREWER, OF PHILADELPHIA, PENNSYLVANIA, ASSIGNOR TO LEEDS & NORTHRUP COMPANY, OF PHILADELPHIA, PENNSYLVANIA, A CORPORATION OF PENNSYLVANIA.

MEASURING AND INDICATING APPARATUS.

1,361,676.  Specification of Letters Patent.  Patented Dec. 7, 1920.

Application filed February 21, 1919. Serial No. 278,407.

*To all whom it may concern:*

Be it known that I, HENRY BREWER, a citizen of the United States, residing in the city and county of Philadelphia, State of Pennsylvania, have invented certain new and useful Improvements in Measuring and Indicating Apparatus, of which the following is a specification.

My invention relates to apparatus for indicating, measuring and recording conditions or variations in conditions, as chemical, physical, electrical and other conditions, and more particularly temperature and variations in temperature.

My invention resides in apparatus, which may be in the nature of recording apparatus or with which a recorder may be coöperatively associated, which controls a circuit or circuits for effecting quite accurate measurement or indication of magnitude of the condition or variation thereof, and particularly of temperature or variation thereof; and with such apparatus may be associated further indicating means, such as lamp or other signals, indicating the general magnitude of the condition, as of temperature, which obtains at a particular time.

More particularly my invention resides in apparatus of the character above referred to wherein a plurality of temperature responsive devices, as thermo-couples, resistance thermometers or the like, are subjected to temperatures which may widely differ and which may exist in different localities, as in different furnaces or the like, said temperature responsive devices being brought successively or alternately into controlling relation with automatic mechanism which will produce the indications or measurements above referred to, and which may in addition produce a record of the temperature variations. It is a further feature of my invention that either a single calibrated measuring or indicating instrument, as a D'Arsonval galvanometer, may be employed for indicating or measuring the temperatures of said temperature responsive devices, or such an indicating or measuring instrument may be employed for each of said temperature responsive devices.

My invention resides in further features of novelty and combination hereinafter described.

For an illustration of some of numerous forms my invention may take, reference may be had to the accompanying drawing, in which:

Figure 1 is a perspective view of structure embodying my invention.

Fig. 2 is an elevational view of a modified structure which may be employed in apparatus such as shown in Fig. 1.

Fig. 3 is a section on the line 3—3 of Fig. 2.

Fig. 4 is a diagrammatic view illustrating part of the structure shown in Fig. 1, together with a calibrated indicating or measuring instrument common to a plurality of temperature responsive devices, with associated signals or indicators, and associated electrical circuits.

Fig. 5 is a diagrammatic view illustrating parts of the apparatus shown in Fig. 1, together with a calibrated indicating or measuring instrument for each of the temperature responsive devices, with associated signals or indicators for each temperature responsive device.

Fig. 6 is a plan view of a fragment of the recorder paper showing a record produced thereon by the two temperature responsive devices in circuit for different lengths of time with the mechanism controlling the recorder.

In the illustrated example of my apparatus parts thereof and their mode of operation are similar to those disclosed in prior Letters Patent of the United States to Leeds No. 1,125,699, January 19, 1915, my invention comprehending, but not being limited to their employment.

Referring to the drawing, M is an electric motor, or any other suitable source of power, which rotates the shaft 1, preferably at substantially constant speed, which in turn drives the worm 2 meshing with and driving the worm gear 3 secured upon the shaft 4. Pivoted near its upper end is a lever 5 back of which and pivoted upon lever 5 on a horizontal axis is the arm 6 on each end of which is a shoe 7 of cork or other suitable material frictionally engaging the rim 8 of the clutch disk or wheel 9 secured upon the shaft 10. Secured upon the shaft 4 is a cam 11 which periodically engages the lever or member 5 and moves it outwardly away from the disk 9 in opposition to a spring, not shown, thereby lifting the shoes 7 free from the rim 8 of clutch disk 9, the aforesaid spring returning the shoes 7 into engagement with rim 8 after predetermined rotation of cam 11. Upon the shaft 4 is secured a second cam 12 which, after the cam 11 has lifted the shoes 7 from rim 8, actuates the end of finger 13 on the lower end of the arm 14 secured at its upper end to the member 15 pivoted at 16. Upon the frame or member 15 is secured the member 17, whose upper edge 18 is inclined and increases in height from the center toward each side. Disposed immediately above the edge 18 is the needle or pointer 19 of any suitable measuring or indicating instrument, as for example, a galvanometer of which 20 is the movable coil or element which swings or deflects the needle or pointer 19 to the right or left. At opposite ends of the member 17 are the abutments 21 for limiting the deflection or swing of needle 19. Directly above the needle 19 and beneath which it normally freely swings are the edges 22, preferably straight and horizontal, upon members 23, 23 pivoted at 24, 24, and extending toward each other, leaving a gap of sufficient width between their inner ends to allow the free entry of the needle 19 when in balanced, zero or mid-position, the needle 19 normally swinging freely between the edge 18 of member 17 and the lower edges of the members 23, 23 which have the downwardly extending arms 25, 25 drawn toward each other by the spring 26. Attached to the lower end of the arm or lever 5 is the triangular plate 27 carrying the pins 28, 28 coöperating with the lower ends of members 25, 25. At opposite ends of the arm 6 are the ears or lugs 29, 29 adapted to be engaged by the cams 30, 30 similar in shape and similarly positioned and secured upon the shaft 4.

Secured upon the shaft 10 is a disk or wheel 31 of insulating material carrying upon its periphery the resistance conductor R, which may be disposed in the form of a helix laid upon the disk 31. Engaging the resistance R is the stationary contact 32 hereinafter referred to. The disk 31 may be secured to the shaft 10 in any suitable angular relation with respect to the other disks or members secured thereon, by set screw 33 threaded through the hub 34 through which the shaft 10 extends.

Secured upon the shaft 10 is a second wheel or disk 35 carrying on its periphery the resistance 36, 37 of a Wheatstone bridge hereinafter referred to. The disk 35 is held in any suitable angular position upon the shaft 10 with respect to the other disks carried thereby by the screw 38 threaded through the hub 39 through which the shaft 10 passes.

Upon the shaft 10 is similarly secured by screw 40 and hub 41 a third disk 42 carrying the arcuate indication controlling contacts 43, 44 and 45, all insulated from each other and preferably from the remainder of the apparatus.

Upon shaft 10 are similarly secured and adjustable as to angular relation thereon the additional disks 35$^a$ and 42$^a$, carrying respectively, the resistances 36$^a$, 37$^a$ of a second Wheatstone bridge and the second group of indication controlling contacts 43$^a$, 44$^a$ and 45$^a$.

While the five separate disks may be employed as described, it will be understood that these disks or any two or more of them may, under suitable circumstances, be one and the same unitary structure whereby the different contacts and resistances may be rotated in unison in predetermined angular relation with respect to each other by shaft 10. It is preferable, however, that the disk 31 be independent, in which case the two disks 35 and 42 may be a unitary structure which may occupy any suitable angular position upon the shaft 10; similarly the disks 35$^a$ and 42$^a$ may be a unitary structure whose angular position upon the shaft 10 may be anything suitable or desired.

In Figs. 2 and 3 such a unitary combination of disks 35 and 42 is indicated, it being understood that a similar unitary combination of disks 35$^a$ and 42$^a$ may be employed if desired. In Figs. 2 and 3 the disk or wheel 35$^b$ is shown, by way of example, as at one end of the shaft 10, though it will be understood that it may be positioned at any place longitudinally of the shaft 10, rotated thereby, and adjustable as to angular position thereon. In the example illustrated the angular position on the shaft 10 is adjustable by clamping the nut 35$^c$ against the hub 39$^a$ on the disk 39$^b$, thrusting the same frictionally against the member 39$^b$ secured to the shaft 10. Upon the periphery of the disk 35$^b$ is shown the resistance 36, 37, which may be a wire disposed as a helix upon a mandrel 35$^d$ and insulated therefrom, the resistance conductor 36, 37 itself terminating, as at $a$ and $b$, Fig. 2, while the mandrel 35$^d$ extends beyond and is clamped to the periphery of the disk 35$^b$ by the clamping piece 35$^e$, secured by screw 35$^f$. Secured to opposite faces of the disk 35$^b$ are the members 35$^g$ and 35$^h$, preferably of insulating material, on whose peripheral edges the stationary contact 59 will ride up in case the disk 35$^b$ is rotated, during the operation of the apparatus, through substantially 180 degrees from the position indicated in Fig. 2. Upon a lateral face of the disk 35$^b$ may be disposed the aforementioned contacts 43, 44 and 45.

Secured upon the shaft 10 is the grooved pulley or wheel 46 of any suitable diameter around which passes the cord 47 which passes over suitable pulleys 48 and is secured to the marker or recorder pen 49, movable transversely, on guides, not shown, with respect to the recorder paper P stored upon a roller or spool 50, and having the marginal perforations 51, engaging teeth or pins upon the periphery of the roller 52, secured upon the shaft 53 which is driven by the motor M through the worm 54, gear 55, shaft 56, worm 57 and gear 58.

Referring to Fig. 4, the resistance R is shown in a potentiometer circuit having the two branches 60 and 61, each including suitable resistances, the branches being connected in parallel with each other and in series with the battery or source of current 62 and adjustable resistance 63. S is a standard cell which may be employed in well known manner for procuring predetermined strength of current through the potentiometer branch 60 by adjustment of rheostat 63 when depressing the key 64, which brings the cell S and galvanometer G into series with each other and in shunt to the potentiometer resistance 65, the needle 19 of the galvanometer G being that indicated in Fig. 1. For normal operation, however, the standard cell is out of circuit and the switch 66 is in depressed or closed position, whereby one terminal of the galvanometer G is connected to the conductor 67, which terminates in contacts 68 and 68$^a$, bearing upon the commutator C, which may be secured upon and rotated by the shaft 56, Fig. 1. In the position indicated in Fig. 4 the contact 68 is in electrical connection through a commutator segment with the contact 69, which connects to one terminal of the temperature responsive device or thermo-couple T, whose remaining terminal connects to the conductor 70 connected to contact 32 which bears upon the resistance R. A second temperature responsive device or thermo-couple T$^1$ has its one terminal connected to the conductor 70 and its other terminal to the contact 71 bearing upon the commutator C, which has a contact which in a later angular position of the commutator C bridges contacts 71 and 68$^a$. The function of these commutator contacts and the associated brushes or contacts is to bring the couples T and T$^1$ successively or alternately into connection with conductors 67 and 70. The arcuate commutator contacts or segments associated with the different thermo-couples are of different lengths, whereby the thermo-couples are in connection with the conductors 67 and 70 for different lengths of time. This is for the purpose of causing the marker 49 of the recorder mechanism to make longer marks as 49$^a$, Fig. 6, for one thermo-couple and shorter marks 49$^b$ for the other, these marks being made longitudinally of the paper P which moves in the direction of the arrow. The curve or record drawn for or under the control of each thermo-couple is recognizable by the difference in lengths of the components or elements 49$^a$ and 49$^b$.

While only two temperature responsive devices T and T$^1$ are shown, it will be understood that my invention is not limited to employment of only two, but is applicable also to the case where a greater number of temperature responsive devices is employed in association with suitable numbers of Wheatstone bridges, meters and lamps.

The thermo-couples, while indicated in diagram as adjacent to each other, will be understood to be located at any distance from each other, subjected to temperatures which may differ widely from each other, the devices or couples being in fact if desired in entirely different and distinct furnaces or other devices.

When thermo-couple T is in circuit with conductors 67 and 70, for the position of the commutator C indicated, the resistances 36, 37, upon disk 35, and the associated resistances 74 and 75 are in communication with the indicating or measuring instrument V. The resistances 36, 37 are indicated as one and the same resistance conductor engaged by the stationary contact 59. Inasmuch as the disk 35 is rotated to verious positions, that part of the resistance 36, 37 to the right of contact 59 is designated 37, while the remainder or part on the other side of contact 59 is designated 36. These two resistances 36, 37, with stationary resistances 74 and 75, constitute the four resistances or arms of a Wheatstone bridge arrangement of which two arms, 36, 37, are rotated by shaft 10. To a point between the stationary resistances 74, 75 is connected a conductor 76, and to the contact 59 is connected a conductor 77, conductors 76 and 77 connecting with any suitable source of current, as a constant potential direct current electric lighting system. The conductor 72 connects with the junction between resistances 36 and 74 and with one terminal of the calibrated indicating or measuring instrument V, as a D'Arsonval galvanometer, of which only the movable coil 82 is indicated, indication of the usual permanent magnets being omitted. The movable coil 82 actuates the needle or pointer 83 which coöperates with the two scales $s$ and $s^1$, either or both of which may be present, as may be desired. The scale $s$ is calibrated in any suitable units, as those of voltage, current or temperature. In the example illustrated, it is calibrated in temperature units to measure or indicate the actual temperature of the thermo-couples. The scale $s$ may be rotatably adjusted to any suitable position about the pivotal axis of the coil 82. The scale $s^1$ may be termed a deviation scale, showing how much the temperatures of the thermo-couples deviate from a given normal or desired temperature corresponding with the zero or mid-marking 0 of the scale $s^1$, the deflections to either side thereof indicating in any suitable units, as of temperature, the amount of deviation, without, however, measuring or indicating the actual temperatures of the thermo-couples. The adjustable resistance 78 in series with the instrument V is for calibration or compensating purposes, as for compensating for resistance of the leads 72, 79 and $82^b$, or other variables which may have to be taken into account. From the resistance 78 extends the lead 79 to the commutator brushes or contacts 80 and $80^a$, with which coöperate, respectively, the commutator brushes or contacts 81 and $81^a$. With the brush 81 connects the conductor or lead $82^b$ connecting with the junction between the resistances 37 and 75 of the Wheatstone bridge. Brushes or contacts 80 and 81 are bridged by a commutator contact, when couple T is in circuit, as indicated, thus bringing the meter V into operative relation with the aforementioned Wheatstone bridge.

Similarly, the commutator brushes or contacts 80 and $81^a$ bring the meter V, when couple $T^1$ is in circuit with conductors 67 and 70, into connection with similar points on the second Wheatstone bridge comprising the resistances $36^a$, $37^a$, $74^a$ and $75^a$, resistances $36^a$ and $37^a$ being rotatable with disk $35^a$ with respect to the contact $59^a$ connected to conductor 77. To a point between the resistances $74^a$ and 75 is made a connection to the conductor 76. With the commutator brush or contact $81^a$ connects the conductor $82^a$ for bringing the meter V into circuit, said conductor connecting with the junction between the resistances $37^a$ and $75^a$.

Electrical incandescent lamps $g$, $b$, $w$ and $r$, respectively colored, if desired, green, blue, white and red, have one terminal connected to the conductor 83 which with the conductor 84 connects to any suitable source of current supply, which may be the same source to which conductors 76 and 77 connect. The conductor 84 connects to the commutator brushes or contacts 85 and $85^a$, with which coöperate, respectively, the brushes or contacts 86 and $86^a$. In the position of the commutator C indicated in Fig. 4, with the thermo-couple T in circuit, the contacts $85^a$ and $86^a$ are bridged by the commutator segment or contact whereby the conductor 84 is brought into electrical communication with the conductor 87 connecting with the two stationary brushes or contacts 89 and 90 coöperating with contacts 43, 44 and 45 associated with the rotatable Wheatstone bridge arms 36, 37. The commutator brushes or contacts 85 and 86 are at a different time, as when couple $T^1$ is in circuit, bridged by a segment or contact of the commutator C to bring conductor 84 into communication with conductor 88, which connects with one terminal of the lamp $g$ as well as with the stationary brushes or contacts $89^a$ and $90^a$, coöperating with the contacts $43^a$, $44^a$ and $45^a$ rotatable by the shaft 10 and coöperating with the second Wheatstone bridge having the rotatable arms $36^a$ and $37^a$. In the position of the parts of the commutator C indicated in Fig. 4 the circuit of the lamp $g$ is open, and from the fact that it does not glow indicates, when two thermo-couples are employed, that a certain one of them is not in circuit, in this case $T^1$; that is, it indicates that thermo-couple T is in circuit. At a later stage when the couple $T^1$ is in circuit, the lamp $g$ will glow, due to bridging of contacts 85 and 86, and will so indicate that that couple is in circuit.

The contacts 43, 44 and 45 are connected, respectively, to contacts $43^a$, $44^a$ and $45^a$ and to terminals of lamps $r$, $w$, and $b$, respectively.

In Fig. 5 the arrangement is in many respects the same as that of Fig. 4; however, a separate indicating or measuring instrument is in this case associated with each thermo-couple or temperature-responsive device; and with each thermo-couple or temperature responsive device is associated a separate set of indicating lamps or signals.

Parts similar to those in Fig. 4 are indicated with like reference characters.

Here again the thermo-couples, or equivalents, T, $T^1$ are controlled by the commutator C, which may be driven by shaft 56, Fig. 1, to be brought into circuit successively or alternately with the conductors 67 and 70. When the thermo-couple T is in circuit, in the position of the commutator C indicated, the indicating or measuring instrument V is in circuit, through commutator contacts or brushes 80, 81 and the associated conductors 79, 72 and $82^b$ with the upper or first Wheatstone bridge comprising the movable resistances 36, 37 and stationary resistances 74, 75. When the thermo-couple T is in circuit in the position of the commutator C indicated, the group of indicating lamps $r$, $w$ and $b$ is brought into operative relation through the commutator brushes or contacts 85 and $86^a$ and conductor 87 with the stationary brushes or contacts 89, 90 coöperating, as described in connection with Fig. 4, with the contacts 43, 44 and 45, which move in unison with the Wheatstone bridge resistances 36 and 37. Similarly a second group of lamps $r^1$, $w^1$ and $b^1$ is later, when couple $T^1$ is in circuit, brought into coöperative relation through commutator contacts or brushes 85 and 86 and conductor 88 with the contacts or brushes $89^a$, $90^a$ coöperating with the contacts $43^a$, $44^a$ and $45^a$ moving in unison with the resistances $36^a$, $37^a$ of the second Wheatstone bridge whose other resistances are 74ᵃ and 75ᵃ. When the couple T¹ is in circuit the junctions between resistances 36ᵃ, 74ᵃ and 37ᵃ, 75ᵃ are connected by conductors 72ᵃ and 82ᵃ with the second measuring or indicating instrument V¹ through the calibrating resistance 78ᵃ with the commutator brushes or contacts 80 and 81ᵃ.

The mode of operation is as follows:

With the thermo-couple T in circuit, it produces an electro-motive-force which is impressed upon the galvanometer G in opposition to the potential impressed upon the galvanometer by the potentiometer current. When these potentials are equal the galvanometer G does not deflect and the needle 19 is in the mid-position indicated in Fig. 1. If now the temperature of the thermo-couple T increases, its electro-motive-force will increase and cause deflection of the galvanometer needle 19 toward the right, for example, whereby, due to the periodic vertical movement of the member 15 by cam 12, the needle 19 is clamped between the inclined edge 18 and the lower edge 22 of the right hand member 23, causing the arm 25 to be tilted in a clockwise direction about its pivot 24, thereby pushing on the right hand pin 28 on plate 27, and so tilting the movable or driving clutch member or arm 6 in a clockwise direction, while cam 11 is holding shoes 7, 7 from the rim 8 of clutch wheel or disk 9, the angular movement of the member 6 being dependent upon the degree of deflection of needle 19. The shoes 7 again engage the disk 8 upon release of the arm 5 of cam 11, and the left hand cam 30 thereafter engages the left hand lug 29, rotating the driving clutch member 6 in counterclockwise direction, carrying the disk 9 in counterclockwise direction through an equal angle. This rotates the resistance R with respect to the contact 32 in such direction as to tend to restore a balance of the electro-motive-forces which tends to decrease the deflection of the needle 19 which eventually, due to successive operations and attaining a balance, may again find itself in mid or zero position indicated in Fig. 1, and no further actuation of the shaft 10 will occur. The apparatus is in balance for the then temperature of the thermo-couple T, and in attaining such balance the marker 49 has been moved transversely to the paper P, making one of the longer marks 49ᵃ, Fig. 6.

If when this balance is again attained the temperature to which the thermo-couple T is subjected is above the normal or desired temperature, the contact 43 will be in engagement with contact 89 and so close the circuit through the red lamp r, which accordingly gives a signal or indication to the effect that the temperature is too high. If the temperature is not far above the normal or desired temperature the contact 43 may be in contact with brush 89 while contact 44 is still in engagement with brush 90, in which case both lamps r and w will simultaneously glow, indicating that the temperature is too high, but only slightly so. Similarly, if the temperature to which the thermo-coupler T is subjected and at which the needle 19 comes to a balance is below the desired or normal temperature, contact 45 will be in engagement with brush 90 and so cause energization of blue lamp b indicating too low a temperature, and if this temperature is not far too low, contacts 45 and 44 will be simultaneously in engagement with contacts 90 and 89, respectively, so that both lamps w and b glow.

While the couple T is in circuit as above assumed, during partial rotation of the commutator C and while the apparatus automatically rebalances itself or moves in direction to rebalance itself, the Wheatstone bridge arms 36, 37 are rotated to like extent and in like direction as the potentiometer resistance R. Assuming the temperature of the couple T to be above normal or desired temperature, and the resistances 36, 37 to have been rotated to a position counterclockwise to that indicated in Fig. 4, resistance 36 will be shorter than resistance 37, the Wheatstone bridge will be unbalanced, and there will be a corresponding difference of potential of pre-determined direction impressed upon the conductors 79, 80, causing the calibrated meter V to deflect toward the right, for example. The needle 83 in so deflecting to the right will, as regards scale s¹, indicate in degrees of temperature, or other suitable units, the extent of departure of temperature of the couple T from the desired or normal temperature, the desired or normal temperature being indicated at 0 on scale s¹.

Supposing the desired or normal temperature for the couple T is 1200 degrees; the scale s is rotated to such position that when there is no current through the galvanometer coil 82 the needle 83 points at 1200 degrees, as indicated in Fig. 4. In other words, the 1200 degree marking of the scale s is brought opposite the zero marking 0 of the scale s¹. When, as assumed, the needle 83 deflects toward the right, it simultaneously indicates as to scale s the actual temperature of the thermo-couple T and as to the scale s¹ merely the extent of departure or deviation from the normal or desired temperature. It may sometimes not be desirable or necessary to have both scales s and s¹ in the instrument, but my invention comprehends employment of either or both.

Similarly, if the temperature of the couple T is below normal or desired temperature, the needle 83 will deflect toward the left, deflection toward the left being due to reversal of polarity at the junctions between the resistances 74, 75 and conductors 79, 80.

What has been stated concerning thermo-couple T, is also true of thermo-couple T¹, the two couples being alternately or successively brought into operative relation with the potentiometer circuit, including resistance R and galvanometer G, by the commutator C which rotates at any suitable or desired speed. When couple T¹ is so brought into circuit, connection between conductor 84 and conductor 87 is broken and established with conductor 88, bringing into operative relation the lamps r, w and b, the contacts 89ᵃ, 90ᵃ, coöperating with contacts 43ᵃ, 44ᵃ and 45ᵃ, moving in unison with the second Wheatstone bridge comprising resistance arms 36ᵃ, 37ᵃ. Here again the action of the indicating lamps is the same as described in connection with thermo-couple T. Similarly when couple T¹ is brought into circuit connection between the meter V and the first Wheatstone bridge, comprising resistances 36, 37, 74 and 75, is broken and established with the second Wheatstone bridge through conductor 82ᵃ. The meter V then operates as before to indicate by scale s the actual temperature of the couple T¹, and by scale s¹ its deviation from the desired or normal temperature.

When couple T¹ is in circuit, the green lamp g will glow, indicating that fact; and when couple T is in circuit lamp g does not glow, and so indicating that fact.

With the apparatus arranged as indicated in Fig. 5 the operation will be understood to be similar to that described in Fig. 4 with the following exceptions:

There are separate indicating or measuring instruments V and V¹ for the two Wheatstone bridge structures, and these meters are brought into circuit by the commutator C alternately or successively in unison with the couples T, T¹, the meters indicating both actual temperature and deviation from normal of their respective thermo-couples.

Furthermore, two groups of red, white and blue lamps are employed, each permanently associated with a Wheatstone bridge structure, the groups being brought into operative relation alternately or successively in unison with the thermo-couples T and T¹. As in the case of Fig. 4, glowing of the white light indicates that the temperature is at the desired or normal temperature; glowing of the red light indicates too high a temperature, and the blue light too low a temperature; and the white light may glow simultaneously with either the red or the blue light, indicating that the temperature is only slightly too high or slightly too low.

Interruption of the circuits of the meters V and V¹ by the commutator C may be omitted, and these meters permanently connected to the respective Wheatstone bridges. But in such case when thermo-couple T¹ is not in circuit its meter V¹ may give indications, due to the fact that its associated Wheatstone bridge has been actuated from normal or zero position by the mechanism shown in Fig. 1, due to deflection of the galvanometer needle 19 under control of the thermo-couple T. But such indication by the meter V¹ may be at such time disregarded if it is remembered or known that its couple T¹ is not in circuit. And this may be indicated by the fact that none of the lamps r¹, w¹ and b¹ is glowing.

What I claim is:

1. The combination with a deflecting member, of a source of power, variable electrical means and a plurality of electrical devices adapted severally to coöperate with said means to control said deflecting member, said means varied by said source of power under control of said deflecting member, means for bringing said electrical devices successively into coöperation with said means, an instrument giving indications respecting said electrical devices, and controllers for said instrument brought successively into coöperation with said instrument and actuated by said source of power under control of said deflecting member.

2. The combination with a deflecting member, of a source of power, variable electrical means and a plurality of electrical devices adapted severally to coöperate with said means to control said deflecting member, said means varied by said source of power under control of said deflecting member, means actuated by said source of power for bringing said electrical devices successively into coöperation with said means, an instrument giving indications respecting said electrical devices, and controllers for said instrument brought successively into coöperation with said instrument and actuated by said source of power under control of said deflecting member.

3. The combination with a deflecting member, of a source of power, variable electrical means and a plurality of electrical devices adapted severally to coöperate with said means to control said deflecting member, said means varied by said source of power under control of said deflecting member, an instrument giving indications respecting said electrical devices, a controller for said instrument for each of said electrical devices, and means for bringing said electrical devices in succession into coöperation with said first named means and their respective controllers into coöperation with said instrument.

4. The combination with a deflecting member, of a source of power, variable electrical means and a plurality of electrical devices adapted severally to coöperate with said means to control said deflecting member, said means varied by said source of power under control of said deflecting member, an instrument giving indications respecting said electrical devices, a controller for said instrument for each of said electrical devices, and means actuated by said source of power for bringing said electrical devices in succession into coöperation with said first named means and their respective controllers into coöperation with said instrument.

5. The combination with a galvanometer having a deflecting member, of a source of power, variable electrical means and a plurality of temperature responsive devices adapted severally to coöperate with said means in controlling said deflecting member, said means variable by said source of power under control of said deflecting member, an instrument giving indications respecting the temperatures of said temperature responsive devices, a controller for said instrument for each of said temperature responsive devices, and means for bringing said temperature responsive devices in succession into coöperation with said first named means and their controllers in succession into coöperation with said instrument.

6. The combination with a galvanometer having a deflecting member, of a source of power, variable electrical means and a plurality of temperature responsive devices adapted severally to coöperate with said means in controlling said deflecting member, said means variable by said source of power under control of said deflecting member, an instrument giving indications respecting the temperatures of said temperature responsive devices, a controller for said instrument for each of said temperature responsive devices, and means actuated by said source of power for bringing said temperature responsive devices in succession into coöperation with said first named means and their controllers in succession into cooperation with said instrument.

7. The combination with a galvanometer having a deflecting member, of a source of power, variable electrical means and a plurality of temperature responsive devices adapted severally to coöperate with said means in controlling said deflecting member, said means variable by said source of power under control of said deflecting member, a second galvanometer giving indications respecting the temperatures of said temperature responsive devices, a Wheatstone bridge for each of said temperature responsive devices adapted to control said galvanometer and varied by said source of power under control of said deflecting member, means for bringing said temperature responsive devices successively into coöperation with said first named means, and means for bringing said Wheatstone bridges successively into coöperation with said second galvanometer.

8. The combination with a galvanometer having a deflecting member, of a source of power, variable electrical means and a plurality of temperature responsive devices adapted severally to coöperate with said means in controlling said deflecting member, said means variable by said source of power under control of said deflecting member, a second galvanometer giving indications respecting the temperatures of said temperature responsive devices, a Wheatstone bridge for each of said temperature responsive devices adapted to control said galvanometer and varied by said source of power under control of said deflecting member, and means for bringing said temperature responsive devices successively into coöperation with said first named means and the respective Wheatstone bridges into coöperation with said second galvanometer.

9. The combination with a galvanometer having a deflecting member, of a source of power, variable electrical means and a plurality of temperature responsive devices adapted severally to coöperate with said means in controlling said deflecting member, said means variable by said source of power under control of said deflecting member, a second galvanometer giving indications respecting the temperatures of said temperature responsive devices, a Wheatstone bridge for each of said temperature responsive devices adapted to control said galvanometer and varied by said source of power under control of said deflecting member, and means actuated by said source of power for bringing said temperature responsive devices successively into coöperation with said first named means and the respective Wheatstone bridges into coöperation with said second galvanometer.

10. The combination with a deflecting member, of a source of power, variable electrical means and a plurality of electrical devices adapted severally to coöperate with said means to control said deflecting member, said means varied by said source of power under control of said deflecting member, means for bringing said electrical devices successively into coöperation with said means, an instrument giving indications respecting said electrical devices, controllers for said instrument brought successively into coöperation with said instrument and actuated by said source of power under control of said deflecting member, a plurality of indicators, contact structure for each of said devices controlling said indicators, and means for bringing said contact structures successively into coöperation with said indicators.

11. The combination with a deflecting member, of a source of power, variable electrical means and a plurality of electrical devices adapted severally to coöperate with said means to control said deflecting member, said means varied by said source of power under control of said deflecting member, means for bringing said electrical devices successively into coöperation with said means, an instrument giving indications respecting said electrical devices, controllers for said instrument brought successively into coöperation with said instrument and actuated by said source of power under control of said deflecting member, and means for indicating which of said devices is in coöperation with said first named means.

12. The combination with a galvanometer having a deflecting member, of a source of power, a potentiometer, a plurality of thermo-couples adapted severally to coöperate with said potentiometer in control of said galvanometer, means for bringing said thermo-couples successively into coöperation with said potentiometer, a resistance of said potentiometer actuated by said source of power under control of said deflecting member, a second galvanometer giving indications respecting the temperatures of said thermo-couples, a Wheatstone bridge for each of said thermo-couples for controlling said second galvanometer and controlled by said source of power under control of said deflecting member to vary the electro-motive-force impressed upon said second galvanometer, and means actuated by said source of power for bringing said Wheatstone bridges successively into coöperation with said second galvanometer.

13. The combination with a galvanometer having a deflecting member, of a source of power, a potentiometer, a plurality of thermo-couples adapted severally to coöperate with said potentiometer in control of said galvanometer, means for bringing said thermo-couples successively into coöperation with said potentiometer, a resistance of said potentiometer actuated by said source of power under control of said deflecting member, a second galvanometer giving indications respecting the temperatures of said thermo-couples, a Wheatstone bridge for each of said thermo-couples for controlling said second galvanometer and controlled by said source of power under control of said deflecting member to vary the electro-motive-force impressed upon said second galvanometer, and means for bringing said Wheatstone bridges successively into coöperation with said second galvanometer.

14. The combination with a galvanometer, of a source of power, variable electrical means and a plurality of temperature responsive devices adapted severally to coöperate with said means in controlling said deflecting member, said means variable by said source of power under control of said deflecting member, a second galvanometer giving indications respecting the temperatures of said temperature responsive devices, a controller for each of said temperature responsive devices for controlling said second galvanometer, means for bringing said temperature responsive devices into coöperative relation with said first named means for different periods of time, a recorder marker actuated by said source of power under control of said deflecting member and producing a disjointed mark for each of said temperature responsive devices, each of said marks comprising components of different lengths, and means for bringing said controllers in succession into operative relation with said second galvanometer.

15. The combination with a galvanometer having a deflecting member, of a source of power, variable electrical means and a plurality of electrical devices adapted severally to coöperate with said means to control said galvanometer, said means variable by said source of power under control of said deflecting member, a recorder marker actuated by said source of power under control of said deflecting member, and means for bringing said electrical devices successively into coöperation with said first named means for different lengths of time, whereby said marker produces a record for each of said devices, said records consisting of component marks of different lengths.

16. The combination with a deflecting member, of a source of power, variable electrical means and a plurality of electrical devices adapted severally to coöperate with said means to control said deflecting member, said means varied by said source of power under control of said deflecting member, means for bringing said electrical devices successively into coöperation with said means, an instrument for each of said electrical devices for making indications with respect thereto, and a controller for each of said instruments actuated by said source of power under control of said deflecting member.

17. The combination with a deflecting member, of a source of power, variable electrical means and a plurality of electrical devices adapted severally to coöperate with said means to control said deflecting member, said means varied by said source of power under control of said deflecting member, means for bringing said electrical devices successively into coöperation with said means, an instrument for each of said electrical devices for making indications with respect thereto, a controller for each of said instruments actuated by said source of power under control of said deflecting member, and means for bringing said controllers successively into coöperation with their respective instruments.

18. The combination with a deflecting member, of a source of power, variable electrical means and a plurality of electrical devices adapted severally to coöperate with said means to control said deflecting member, said means varied by said source of power under control of said deflecting member, means for bringing said electrical devices successively into coöperation with said means, an instrument for each of said electrical devices for making indications with respect thereto, a controller for each of said instruments actuated by said source of power under control of said deflecting member, and means for bringing said controllers successively into coöperation with their respective instruments in unison with said second named means.

19. The combination with a galvanometer having a deflecting member, of a source of power, variable electrical means and a plurality of temperature responsive devices adapted severally to coöperate with said means to control said galvanometer, said means variable by said source of power in control with said deflecting member, an instrument for each of said temperature responsive devices for making indications of temperature of the same, a controller for each of said instruments actuated by said source of power under control of said deflecting member, and a commutator for bringing said temperature responsive devices successively into coöperation with said means and for bringing said controllers successively into coöperation with their respective instruments.

20. The combination with a galvanometer having a deflecting member, of a source of power, electrical means and a plurality of temperature responsive devices adapted severally to coöperate therewith in control of said galvanometer, means for bringing said temperature responsive devices successively into coöperation with said means, a group of indicators for each of said temperature responsive devices, and contact structure controlling each of said groups and actuated by said source of power under control of said deflecting member.

21. The combination with a galvanometer having a deflecting member, of a source of power, electrical means and a plurality of temperature responsive devices adapted severally to coöperate therewith in control of said galvanometer, means for bringing said temperature responsive devices successively into coöperation with said means, a group of indicators for each of said temperature responsive devices, contact structure controlling each of said groups and actuated by said source of power under control of said deflecting member, and means for bringing said contact structures into operative relation with said groups of indicators in succession.

22. The combination with a galvanometer having a deflecting member, of a source of power, a potentiometer and a plurality of thermo-couples adapted severally to coöperate with said potentiometer in control of said galvanometer, a meter for each of said thermo-couples, a Wheatstone bridge for each of said meters, each of said bridges comprising resistance moved by said source of power under control of said deflecting member to vary the electro-motive-force impressed upon the associated meter, and means for bringing said thermo-couples successively into coöperation with said potentiometer and said meters successively into coöperation with their Wheatstone bridges.

23. The combination with a galvanometer having a deflecting member, of a source of power, a potentiometer and a plurality of thermo-couples adapted severally to coöperate with said potentiometer in control of said galvanometer, a meter for each of said thermo-couples, a Wheatstone bridge for each of said meters, each of said bridges comprising resistance moved by said source of power under control of said deflecting member to vary the electro-motive-force impressed upon the associated meter, means for bringing said thermo-couples successively into coöperation with said potentiometer and said meters successively into coöperation with their Wheatstone bridges, a group of indicators for each thermo-couple, contact structure for each of said groups actuated in unison with one of said Wheatstone bridges, and means for bringing said groups of indicators successively into coöperation with their respective contact structures.

24. The combination with a deflecting member, of a source of power, variable electrical means and a plurality of electrical devices adapted severally to coöperate with said means to control said deflecting member, said means varied by said source of power under control of said deflecting member, means actuated by said source of power for bringing said electrical devices successively into coöperation with said means, an instrument giving indications respecting said electrical devices, controllers for said instrument brought successively into coöperation with said instrument and actuated by said source of power under control of said deflecting member, and a marker actuated by said source of power under control of said deflecting member producing a record respecting said electrical devices.

25. The combination with a deflecting member, of a source of power, variable electrical means and a plurality of electrical devices adapted severally to coöperate with said means to control said deflecting member, said means varied by said source of power under control of said deflecting member, an instrument giving indications respecting said electrical devices, a controller for said instrument for each of said electrical devices, means actuated by said source of power for bringing said electrical devices in succession into coöperation with said first named means and their respective controllers into coöperation with said instrument, and a marker actuated by said source of power under control of said deflecting member producing a record respecting said electrical devices.

26. The combination with a galvanometer having a deflecting member, of a source of power, variable electrical means and a plurality of temperature responsive devices adapted severally to coöperate with said means in controlling said deflecting member, said means variable by said source of power under control of said deflecting member, an instrument giving indications respecting the temperatures of said temperature responsive devices, a controller for said instrument for each of said temperature responsive devices, means for bringing said temperature responsive devices in succession into coöperation with said first named means and their controllers in succession into coöperation with said instrument, and a marker actuated by said source of power under control of said deflecting member to produce a record respecting the temperatures of said temperature responsive devices.

27. The combination with a galvanometer having a deflecting member, of a source of power, variable electrical means and a plurality of temperature responsive devices adapted severally to coöperate with said means in controlling said deflecting member, said means variable by said source of power under control of said deflecting member, a second galvanometer giving indications respecting the temperatures of said temperature responsive devices, a Wheatstone bridge for each of said temperature responsive devices adapted to control said galvanometer and varied by said source of power under control of said deflecting member, means for bringing said temperature responsive devices successively into coöperation with said first named means, means for bringing said Wheatstone bridges successively into coöperation with said second galvanometer, and a marker actuated by said source of power under control of said deflecting member to produce a record respecting the temperatures of said temperature responsive devices.

28. The combination with a galvanometer having a deflecting member, of a source of power, a potentiometer, a plurality of thermo-couples adapted severally to coöperate with said potentiometer in control of said galvanometer, means for bringing said thermo-couples successively into coöperation with said potentiometer, a resistance of said potentiometer actuated by said source of power under control of said deflecting member, a second galvanometer giving indications respecting the temperatures of said thermo-couples, a Wheatstone bridge for each of said thermo-couples for controlling said second galvanometer and controlled by said source of power under control of said deflecting member to vary the electromotive-force impressed upon said second galvanometer, means for bringing said Wheatstone bridges successively into coöperation with said second galvanometer, and a marker actuated by said source of power under control of said deflecting member for producing a record respecting the temperatures of said thermo-couples.

29. The combination with a galvanometer having a deflecting member, of a source of power, a potentiometer and a plurality of thermo-couples adapted severally to coöperate with said potentiometer in control of said galvanometer, a meter for each of said thermo-couples, a Wheatstone bridge for each of said meters, each of said bridges comprising resistance moved by said source of power under control of said deflecting member to vary the electro-motive-force impressed upon the associated meter, means for bringing said thermo-couples successively into coöperation with said potentiometer and said meters successively into coöperation with their Wheatstone bridges, and a marker actuated by said source of power under control of said deflecting member for producing a record respecting the temperatures of said thermo-couples.

30. The combination with a plurality of temperature responsive devices, of means for indicating temperature thereof, signaling means for each of said temperature responsive devices, and switching structure for bringing said signaling means successively into operative relation and said temperature responsive devices into coöperation with said indicating means.

31. The combination with a plurality of temperature responsive devices, of means for indicating temperature thereof, a group of signal lamps for each of said temperature responsive devices, switching means for bringing said groups of lamps successively into operative relation, and switching means for bringing said temperature responsive devices into coöperation with said indicating means.

32. The combination with a plurality of heat responsive devices, of means for making indications respecting temperature thereof, a plurality of signal lamps, switching means for controlling said lamps, and means for bringing said temperature responsive devices successively into coöperation with said indicating means.

33. The combination with a plurality of temperature responsive devices, of an instrument for each of said devices indicating the temperature thereof, means for successively bringing said temperature responsive devices and said instruments into operation, a group of lamps for each of said temperature responsive devices, and means operating with said first named means for bringing said groups of lamps into operative relation with said temperature responsive devices.

34. The combination with a plurality of devices responsive to changes in a condition, of a structure movable under control of said devices, an indicator for each of said devices, means operated by said movable structure controlling said indicators, and means for bringing said devices successively into coöperation with said structure and said indicators successively into coöperation with said first named means.

35. The combination with a plurality of temperature responsive devices, of galvanometric means the extent of whose deflections is a measure of the temperatures of said devices, a group of signal lamps for each of said devices, and a switch controlling operation of each of said groups of lamps.

36. The combination with a plurality of temperature responsive devices, of means for indicating the temperatures thereof, a switch for each of said devices for bringing the same into coöperative relation with said means, a group of signal lamps for each of said devices, and a switch for each of said groups of signal lamps for bringing the same into coöperative relation with said devices.

37. The combination with a plurality of temperature responsive devices, of means for indicating the temperatures thereof, a group of signal lamps for each of said devices, switches for each of said temperature responsive devices and each of said groups of lamps, and means operating said switches for bringing said devices successively into coöperation with its corresponding group of signal lamps and said indicating means simultaneously.

38. The combination with a plurality of temperature responsive devices, of means for indicating the temperatures thereof, a group of signal lamps for each of said temperature responsive devices, and switching mechanism for periodically bringing said groups of lamps and said devices into coöperative relation.

39. The combination with a plurality of temperature responsive devices, of means for indicating the temperatures thereof, a group of lamps for each of said devices, means for periodically bringing said devices into operative relation with said indicating means and said groups of lamps into operative relation with said devices, and switching mechanism for each of said groups of lamps operated in response to changes in temperature of said devices controlling the lamps of a group individually.

40. The combination with a plurality of temperature responsive devices, of means for indicating the temperatures thereof, a group of signal lamps for each of said devices, switching mechanism for each of said groups of lamps, each switching mechanism responsive to changes in temperature of one of said devices and controlling the lamps of the corresponding group individually, and means for periodically associating one of said devices with one of said groups of lamps and said indicating means.

In testimony whereof I have hereunto affixed my signature this 19th day of February, 1919.

HENRY BREWER.